Aug. 2, 1932.  O. MYERS  1,870,133
TONGS OR PLIERS
Filed Dec. 18, 1930
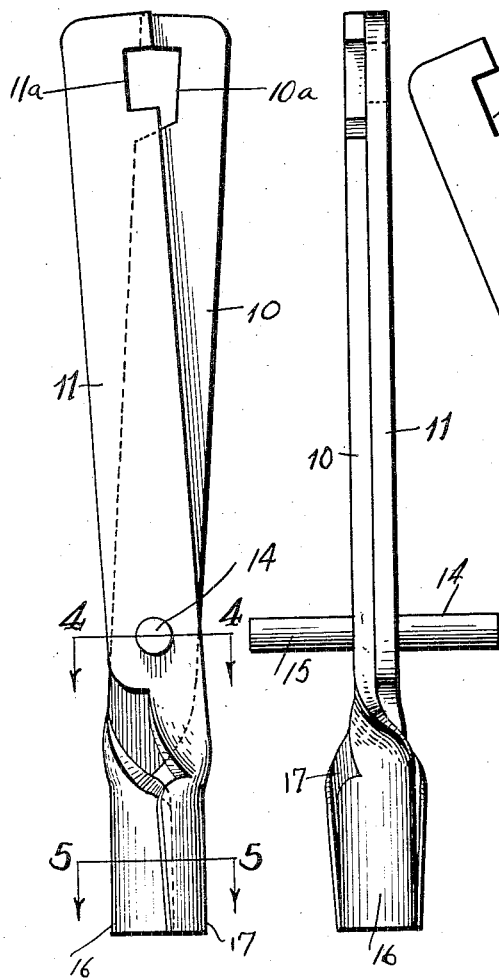
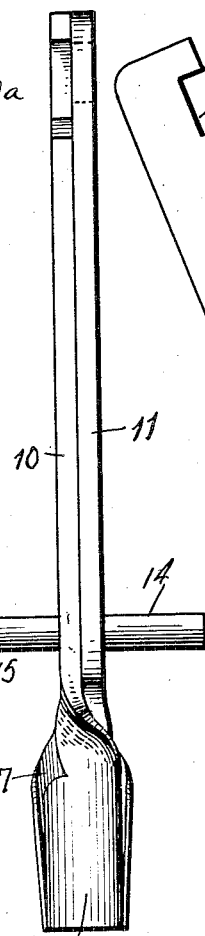
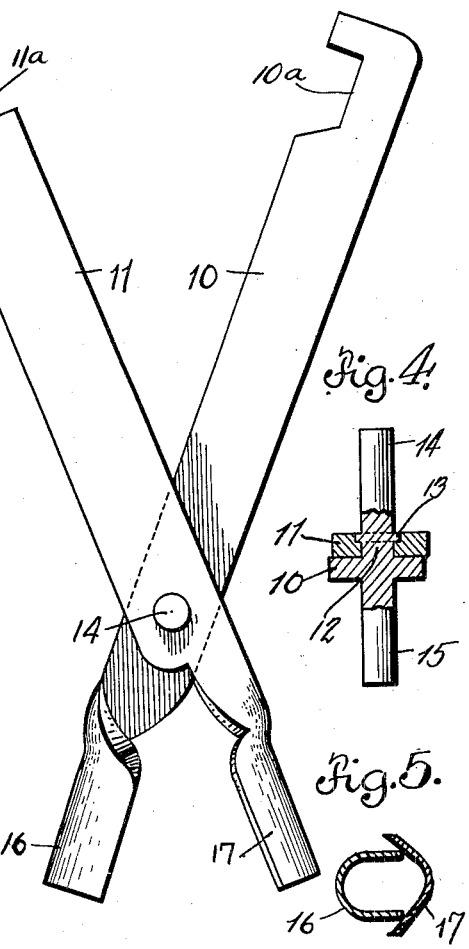
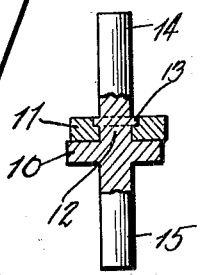
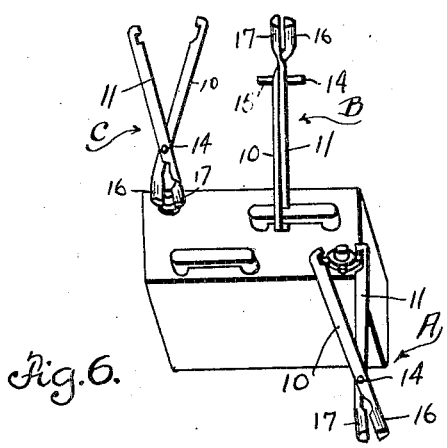
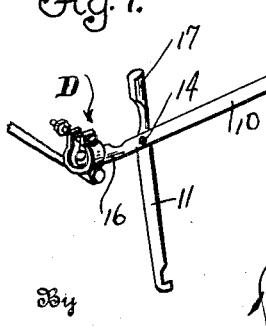
Inventor
Oran Myers.
By Bryant & Lowry
Attorneys Patented Aug. 2, 1932

1,870,133

UNITED STATES PATENT OFFICE

ORAN MYERS, OF SACRAMENTO, CALIFORNIA

TONGS OR PLIERS

Application filed December 18, 1930. Serial No. 503,335.

This invention relates to tongs or pliers and has special reference to tongs designed particularly for use in connection with storage batteries, battery connectors and the like.

One important object of the invention is to provide an improved construction of tongs adapted for a wide variety of uses in connection with storage batteries and their adjuncts.

A second important object of the invention is to provide tongs having a novel form of jaws which are not only well adapted for gripping battery terminals for any purpose but which are also specially adapted for use in cleaning salts and oxides from such terminals.

A third important object of the invention is to provide a pair of tongs having jaws for gripping articles, one of the jaws having edges which assist in obtaining a firm grip on an article but also constitutes a scraper.

A fourth important object of the invention is to provide such a pair of tongs with pivot means also forming a finger grip by which the tongs and article held thereby may be lifted.

A fifth important object of the invention is to provide a novel form of tongs having nut gripping jaws on their handles.

With the above and other objects in view that will become apparent as the nature of the invention is better understood, the same consists in the novel form, combination and arrangement of parts hereinafter more fully described, shown in the accompanying drawing and claimed.

In the accompanying drawing like characters of reference indicate like parts in the several views, and:

Figure 1 is a side elevation of the tongs closed;

Figure 2 is a side elevation thereof at right angles to Figure 1;

Figure 3 is a side elevation with the tongs open;

Figure 4 is a section on the line 4—4 of Figure 1, the view being partly in elevation;

Figure 5 is a section on the line 5—5 of Figure 1;

Figure 6 is a view of a battery showing a variety of uses to which the tongs may be put in connection therewith;

Figure 7 is a view showing the tongs as used to clean out the terminal of a battery connector;

Figure 8 is a view showing the tongs employed for spreading a battery terminal.

The tongs as here shown consists of two metal bars 10 and 11. A pivot pin 12 extends from one side of the member 10 through a suitable opening in the member 11 so that these members are pivotally connected in crossing relation. A collar 13 is formed on the pin 12 and seats in a suitable rabbet formed around the opening in the member 11 so that the two members cannot be separated. An extension 14 is formed on the pin and a second pin 15 projects from the member 10 in alinement with the extension but in the opposite direction. The pin 15 and extension 14 thus form a finger grip or cross handle for the tongs and this cross handle, being at the pivot point tends neither to open nor close the tongs so that either end thereof may be used to grasp an article without there being that tendency to open and release the article if this cross handle was located between the pivot and the ends grasping the article.

The adjacent edges of the members 10 and 11 adjacent the outer ends are notched as at 10a and 11a for use as a nut wrench and the purpose later to appear.

One end of one of these members is twisted and bent to provide a jaw 16 U-shaped in cross section while the corresponding end of the other member is similarly twisted and bent to provide a jaw 17 substantially V-shaped in cross section and having its sides overlapping and projecting angularly outward from the sides of the jaw 16 when the tongs are closed. The side edges of the jaw 17 are shaped as at 18 to form scraper blades and also act to bite into a grasped article when forcibly gripped so as to give a firmer grasp of the article especially when it is desired to rotate the same.

At the other extremities of the two members there is provided confronting notches 19 suitable for grasping a nut or the connecting bar between two sections of a battery.

Some of the many uses of the tongs will be understood from Figs. 6 and 7 where the tongs are shown at A as being used to tighten or loosen a nut at the notched end 10a and 11a, at B as being used to lift the battery by the notched ends and at C as grasping a battery terminal by the jaws 16 and 17. In the last case the jaws may be lightly closed on the terminal end and rotated to clean and scrape the same or they may be caused to grip it firmly to enable it to be screwed in or out in the case of a screw terminal. At D the scraper jaw 17 is shown as being used to scrape out the interior of a connector terminal. As shown at E in Figure 8, the tongs are used for separating the ends of a battery terminal. A wide variety of other uses will suggest themselves to one working with these tongs but it is not thought necessary to show all possible uses since those disclosed indicate a sufficient number of typical uses to enable the range of utility to be apparent.

There has thus been provided a simple and efficient device of the kind described and for the purpose specified.

It is obvious that changes may be made in the form and construction of the invention without departing from the principles thereof. It is not, therefore, desired to confine the invention to the exact form herein shown and described, but it is desired to include all such as come within the scope claimed.

Having thus described the invention, what is claimed is:—

A tongs including a pair of pivotally connected members, a jaw on one of said members U-shaped in cross-section, and a coacting jaw on the other member V-shaped in cross-section and having its sides overlapping the sides of the first jaw in angular relation, the side edges of the V-shaped jaw being sharpened to form gripping and cutting edges.

In testimony whereof I affix my signature.

ORAN MYERS.